United States Patent
Rane et al.

(10) Patent No.: US 8,427,509 B2
(45) Date of Patent: Apr. 23, 2013

(54) METHOD FOR EMBEDDING MESSAGES INTO DOCUMENTS USING DISTANCE FIELDS

(75) Inventors: Shantanu Rane, Cambridge, MA (US); Ronald N. Perry, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1150 days.

(21) Appl. No.: 12/347,277

(22) Filed: Dec. 31, 2008

(65) Prior Publication Data
US 2010/0164984 A1 Jul. 1, 2010

(51) Int. Cl.
*G09G 5/00* (2006.01)
(52) U.S. Cl.
USPC ........... 345/636; 345/467; 345/589; 345/611; 345/613
(58) Field of Classification Search .................. None
See application file for complete search history.

(56) References Cited

U.S. PATENT DOCUMENTS 7,106,332 B2 * 9/2006 Perry et al. ............... 345/467
2006/0061088 A1 * 3/2006 Harrington et al. ......... 283/51

OTHER PUBLICATIONS

Huang et al., "Interword distance changes represented by sine waves for watermarking text images," IEEE Trans. On Circuits and Systems for Video Technology, vol. 11, No. 12, pp. 1237-124, Dec. 2001.*
Villan et al., "Text data-hiding for digital and printed documents: Theoretical and practical considerations," SPIE-IST Electronic Imaging, pp. 15-19, Jan. 2006.*

* cited by examiner

*Primary Examiner* — Antonio A Caschera
(74) *Attorney, Agent, or Firm* — Dirk Brinkman; Gene Vinokur

(57) ABSTRACT

A method embeds a message into a document containing a set of glyphs. Individual glyphs in the document, groups of glyphs in the document, or the entire document are represented using a distance field that includes distance values from the shapes of interest. Each symbol of the message is represented as modifications of a subset of the distance values in the distance field. This subset of the distance values in the distance field is modified according to modification to produce a modified glyph in a modified document, wherein the symbol in the message is embedded in the modified glyph.

25 Claims, 6 Drawing Sheets

100

200

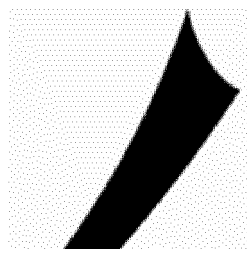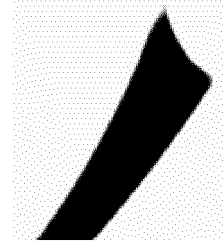
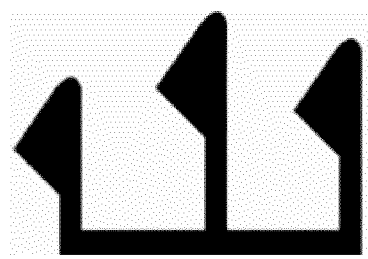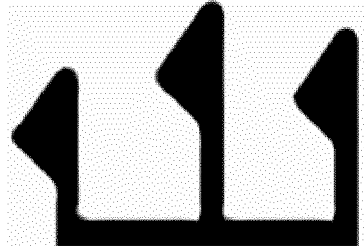
Fig. 4A  Fig. 4B
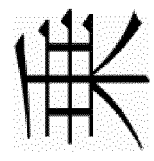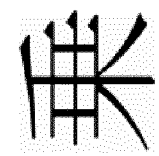

METHOD FOR EMBEDDING MESSAGES INTO DOCUMENTS USING DISTANCE FIELDS

RELATED PATENT APPLICATION

The following patents and patent applications, relevant to the present application, and are incorporated herein by reference:

a. U.S. Pat. No. 6,396,492, issued May 28, 2002, entitled "Detail-directed hierarchical distance fields;"

b. U.S. Pat. No. 7,002,570, issued Feb. 21, 2006, entitled "System and Method for Generating Adaptively Sampled Distance Fields with Bounded Distance Trees;"

c. U.S. Pat. No. 7,034,845, issued Mar. 13, 2007, entitled "Antialiasing an Object Represented as a Two-Dimensional Distance Field in Image-Order;"

d. U.S. Pat. No. 7,123,271, issued Oct. 17, 2006, entitled "Antialiasing a Set of Objects Represented as a Set of 2D Distance Fields in Image-Order;" and e. U.S. patent application Ser. No. 12/329,869, filed Dec. 8, 2008, entitled "Method for Embedding Message into Document."

FIELD OF THE INVENTION

This invention relates generally to embedding messages into documents, and more particularly to embedding and detecting messages in documents using distance fields.

BACKGROUND OF THE INVENTION

Watermarks

Watermarks are often embedded in documents as messages. The embedded messages can be used, e.g., for security, privacy, and copyright protection.

Watermarking for paper "hard-copy" documents differs from electronic "soft-copy" watermarking. For soft-copy documents, all operations such as watermark insertion, document copying, document degradation and watermark extraction occur in the digital domain, e.g., in PDF or Postscript documents. On the contrary, in the case of hard-copy documents, document degradation occurs in the hard-copy domain. Watermarks in hard-copy documents can be degraded when the documents are copied, scanned, faxed or otherwise manipulated. Hard-copy watermarks can also be physically damaged, e.g., crumpled, or torn intentionally or unintentionally.

Glyphs

A glyph, as defined herein, is a fundamental graphic object. The most common examples of glyphs are text characters or graphemes. Glyphs may also be ligatures, that is, compound characters, or diacritics. A glyph can also be a pictogram or ideogram. The term glyph can also be used for a non-character, or a multi-character pattern. As used herein, a glyph is some arbitrary graphic shape or object, which could be 2- or N-dimensional, where N is an integer larger than 2.

Message Embedding

There are a number of known methods for embedding hidden messages in media signals such as images, video, and audio. However, embedding hidden messages inside structured glyphs is a difficult problem. Even small changes to the structure, e.g., spacing and orientation, can be detected by the human visual system. Accordingly, changes to the glyphs, for the purpose of watermarking, must be very small.

This problem is even more difficult in the case of hard-copy watermarking. A hard-copy document can undergo physical deteriorations when it changes hands, is torn, or folded. A message that would have been detectable in an electronic version of the document can be lost when the printed document is photocopied or scanned, e.g., subtle changes in gray level will be lost after copying.

Conventional Message Embedding Methods

Some conventional message embedding methods treat a text document as an image and use image-based watermarking techniques. One disadvantage of these methods is that they do not work well with printers, which primarily operate on bitmapped representations of individual text characters or half-tone representations of colors and shades.

Another conventional method slightly alters the color of characters such that the difference is imperceptible to the eye, but can be sensed by a scanner. Because the embedded message is invisible, it is difficult to alter the watermark. However, the disadvantage of this method is that the small differences in color or gray-level are easily lost when the document is copied.

Another method modulates the distance between individual letters or between individual words or between successive lines of text. At low embedding rates, this method is nearly invisible to the eye, and survives copying. However, the disadvantage of this method is that at high embedding rates, the non-uniform distances between the characters, or words or lines becomes visible and annoying to a reader.

Another method employs the effect of dithering by placing a checkerboard-like black-and-white pattern of dots on the border of entire character, making the entire character narrower or wider than normal. However, this method is not robust to photocopying because the individual dot patterns would be too small to be retained after photocopying.

Another method embeds a pseudo random pattern of dots in the background of the document irrespective of the location of the text. The dots, although relatively unobtrusive, can still be easily removed. Further, the dots are small and may not survive more than one round of photocopying.

Dirty Paper Coding

Dirty Paper Coding (DPC), also referred to as "Writing on Dirty Paper" is a method of encoding a message in the presence of some side information. The side information is known to the encoder but not to the decoder. The side information generally consists of some interfering signal at the encoder. The encoder's task is to encode the desired message in such a way that the decoder must be able to recover the message without possessing any knowledge of the interfering signal. In other words, the decoder should be able to read a message from a "dirty" document without a priori knowledge of which portion constitutes the actual message and which portion is noise. Hence the name "Dirty Paper Coding."

Distance Fields

The shape of an object, e.g., a glyph, can be represented in a memory of a computer system as a collection of sample points in an N-dimensional space. Associated with each sample point is a distance from the sample point to a boundary of the shape. The distances are positive or negative to indicate whether the sample point lies inside or outside the boundary, and zero when exactly on the boundary. The collection of sample points with the associated distance values is called a sampled distance field. Distance fields can also be represented as analytic procedures stored in the memory of the computer system.

We use the general term distance field to refer to all types of distance fields, both sampled and non-sampled.

The distance field can be used to represent attributes other than the shape of the glyph, such as color, gray-level, and texture. More precisely, there is a mapping from the distance values of the distance field representing the glyph to density values representing other attributes of the glyph.

Adaptively Sampled Distance Fields (ADFs)

In an adaptively sample distance field (ADF), the density of the sample points depends on the level of detail required to represent different parts of the shape. For example, complicated local variations may require a higher density of sample points. Thus, the ADF is a representation that enables processing of arbitrary shapes, e.g., glyphs such as text characters, cartoons, and logos.

SUMMARY OF THE INVENTION

It is an object of the invention to provide a method for embedding a message in soft-copy and hard-copy documents as a watermark.

It is a further object of the invention to provide such a method that the message is unobtrusive to a reader of the document.

It is a further object of the invention to provide such a method that is suitable for embedding a relatively large message.

It is a further object of the invention to provide such a method that the embedded message extraction is resistant to physical deteriorations of the document.

It is a further object of the invention to enable physical copying of the document without destroying the message.

The invention results from the realization that by modifying distance values in a distance field representing a glyph, it is possible to modify the shape of that glyph in subtle ways thereby embedding a hidden message in a document.

The invention further results from the realization that by modifying the density values associated with the underlying distance field of a glyph, it is possible to modify the appearance of the glyph thereby embedding a hidden message in a document.

Dirty Paper Coding (DPC), also referred to as "Writing on Dirty Paper", is a method of encoding a message in the presence of some side information. The side information is known to the encoder but not to the decoder. In the context of watermarking based on DPC, the watermark plays the role of the message to be encoded while the document plays the role of the interfering signal at the encoder.

Adaptively sample distance fields (ADFs) have been widely adopted as the underlying data structure for representing scalable character fonts for digital displays. Essentially, the ADF contains distance values, which represent the shape of a glyph as dictated by, e.g., the choice of the font.

Using ADFs for message embedding allows subtle modifications to the shape and/or appearance of the character that are invisible to a common reader, and can only be recovered by a detector designed for that purpose.

This enables embedding of tracking information, e.g., copyright information, or authentication information inside portable document format (PDF) or Word documents, images, videos, corporate logos, and printed documents. Potential applications of the invention include copyright protection, email tracking, file transfer tracking, document authentication, tampering detection, and printer and device forensics.

BRIEF DESCRIPTION OF THE DRAWINGS

FIGS. 4A-4B are respectively diagrams of an unmodified and modified glyph according to the embodiments of the invention;

DETAILED DESCRIPTION OF THE PREFERRED EMBODIMENT

The example glyphs and documents described herein are represented by Adaptively Sampled Distance Fields (ADFs). However, all the embodiments work equally well with other types of distance fields, e.g., a regularly sampled distance field or a procedural distance field.

The embodiments of our invention provide a method for embedding symbols of a message into a document containing, i.e., including, a set of glyphs. For example, shapes of the glyphs are represented using ADFs, and the distance values in the ADFs are modified according to symbols of the message to be embedded. This results in a modification of the shape of the glyph which is generally invisible to the human visual system under normal viewing conditions. Thus, the slight change in shape is difficult to locate and alter, while at the same time this change is robust to operations such as photocopying of the document.

Message Embedding

Figure 1:
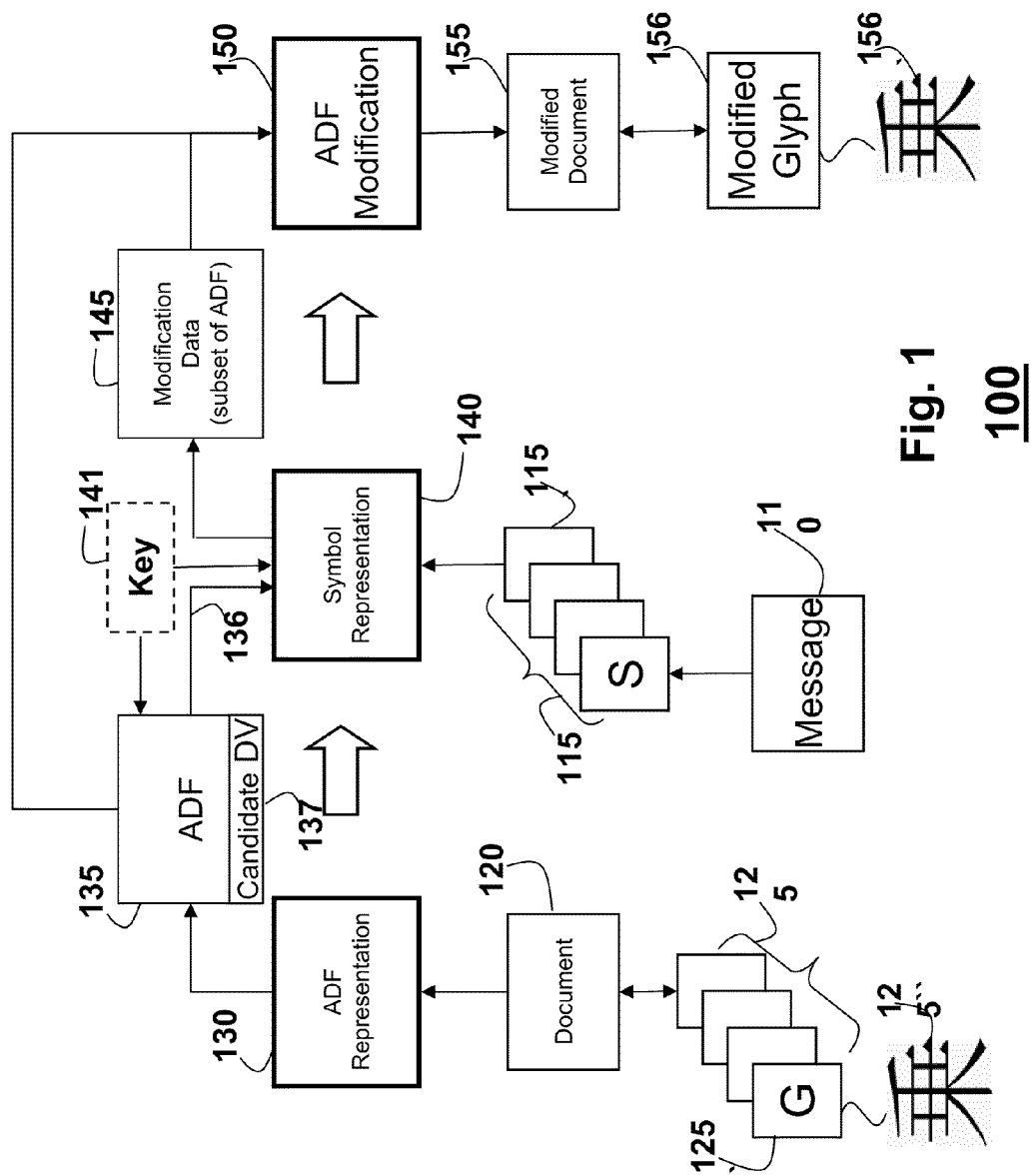
FIG. 1 is a block diagram of a method for embedding a message of symbols into a document including a set of glyphs according to embodiments of an invention.

FIG. 1 shows a block diagram of a method 100 for embedding the symbols of the message into the document including a set of glyphs according to an embodiment of an invention. The document 120 includes the set of glyphs 125, for example a glyph 125'. A glyph 125" is a visual example of the glyph 125'. The glyph 125' is represented 130 as an ADF 135. The ADF 135 includes distance values. Alternatively or additionally, the entire document 120 is represented 130 as a single ADF 135.

A message 110 to be embedded into the document 120, includes a set of symbols 115, for example a symbol 115'. The method 100 represents 140 the symbol 115' as modification data 145 of a subset 136 of the distance values in the ADF 135.

In some embodiments of our invention, the subset 136 is selected from candidate distance values 137 in the unmodified ADF 135. Only those distance values of the ADF 135 should be candidates 137 for embedding, which when modified 150 result in an imperceptible change in the overall shape of the glyph 125'. One method for determining candidate distance values 137 measures the changes in shape between adjacent cells of the ADF 135, which represent a boundary of the glyph 125', and chooses as candidates 137 distance values of the cells which are very similar to distances in neighboring cells.

Such candidates are used, for example, if the message will be embedded as a slight modification of the local curvature of the glyph 125'. Another method to determine candidate distance values 137 chooses those portions of the glyph 125' where the sampling density of the ADF 135 is the highest. Such candidates are used if the message 110 is embedded by rendering the glyph 125' at a slight decrease in the sampling density. Another example of a method for determining candidate distance values 137 chooses portions of the glyph 125' where the local gradient either very high or very low. The gradient on the boundary is calculated from the distance values of the ADF 135 at the vertices of the cells containing the boundary.

In some embodiments of our invention we use continuous stroke modulation (CSM) for embedding the message 110 into documents that are to be displayed on an electronic display or paper. In those embodiments, the candidate distance values 137 in the distance field of the ADF 135 are associated with a set of density values via a mapping function that depends not only on the shape of the glyph, but also on other properties, such as illumination conditions, characteristics of the device or medium on which the glyph is displayed, and so on. Examples of density values include intensity of pixels, color values, gray-scale values, and textures associated with glyphs in the document or with a part of the document itself.

To encode the message, the method 100 can choose to leave or to modify the distance values 137, but perform subtle modifications only to the associated density values. Those embodiments produce subtle local modifications in the gray-level or color or thickness of the strokes of the glyph 125', which are detectable by a machine but would go unnoticed by the human visual system. All the deterministic and probabilistic techniques used to determine candidate distance values to be modified can be applied to determine the candidate density values as well.

Note, that not all candidate distance or density values need to be modified 150 for message embedding. Among the suitable candidates, the final selection of distance values or density values in the ADF which will be changed can be done using a secret key 141 which is known by the embedder, e.g., the method 100, and by the detector, e.g., a method 200, see FIG. 2. The subset 136 of the distance values in the ADF 135, defines a part of a shape of the glyph 125' to be modified to embed the symbol 115'. In embodiments in which the entire document 120 is represented as the ADF, the subset 136 typically is associated with a shape of one or more glyphs contained in the document 120.

The modification data 145 includes information necessary to modify the subset of the ADF 136 such that the symbol 115' is embedded. For example, the modification data 145 could include new modified distance values of the subset 136. Alternatively, the modification data 145 could include correction values indicative of how the distance values in the subset 136 should be modified to embed the symbol 115'.

The subset 136 of the distance values in the ADF 135 is modified 150 according to the modification data 145 to produce a modified glyph 156 in a modified document 155, in which the symbol 115' in the message 110 is embedded in the modified glyph 156. Depending upon the way in which the distance values in the subset 136 are modified, the effect of this operation can be a subtle change in the local curvature or other modifications of the shape of the glyph 156 comparing to the glyph 125', which in turn embeds the symbol 115', e.g., a 0-bit or a 1-bit. The glyph 156' is a visual example of the modified glyph 156. As shown on FIGS. 4A and 4B, the modifications of the glyph 156 can be seen only after magnifications, and are almost invisible to a casual reader.

Note that the modifications in the shape of the glyph due to the embedded data can be "deterministic" or "probabilistic." By deterministic, we mean that the shape of the modified glyph 156 is uniquely determined by the shape of the unmodified glyph 125' and the symbol 115' of the message 110. Examples of deterministic modifications include the ones described above, i.e., choosing candidate sites in the original ADF based on sampling density or gradient.

By probabilistic modification, we mean that the shape of the modified glyph 156 is not uniquely determined by the unmodified glyph 125' and the message symbol, but can vary according to a suitably chosen random variable that is known only to the embedder and the extractor. One example of such a random variable is the secret key 141 used to select the embedding sites within the ADFs of unmodified glyphs. This means that if a certain unmodified glyph occurs multiple times in a document, then the modified glyphs (after message embedding) will look different each time. This randomization makes it extremely difficult for attackers to reverse-engineer the embedding scheme.

The modified document 155, including the modified glyph 156 could be rendered before the symbol 115' is extracted from the document 156. Example of rendering includes copying, printing, faxing, emailing, displaying, scanning of the modified document 155, or combinations thereof.

In some embodiments of our invention, packetization symbols are inserted in the message 110 in order to group symbols of the message 110 into packets. Examples of the packetization symbols include a begin packet symbol, a packet number symbol, and a synchronization symbol. For a detailed description of inserting the packet symbols into the message, see the related U.S. patent application Ser. No. 12/329,869.

Message Detection

Figure 2:
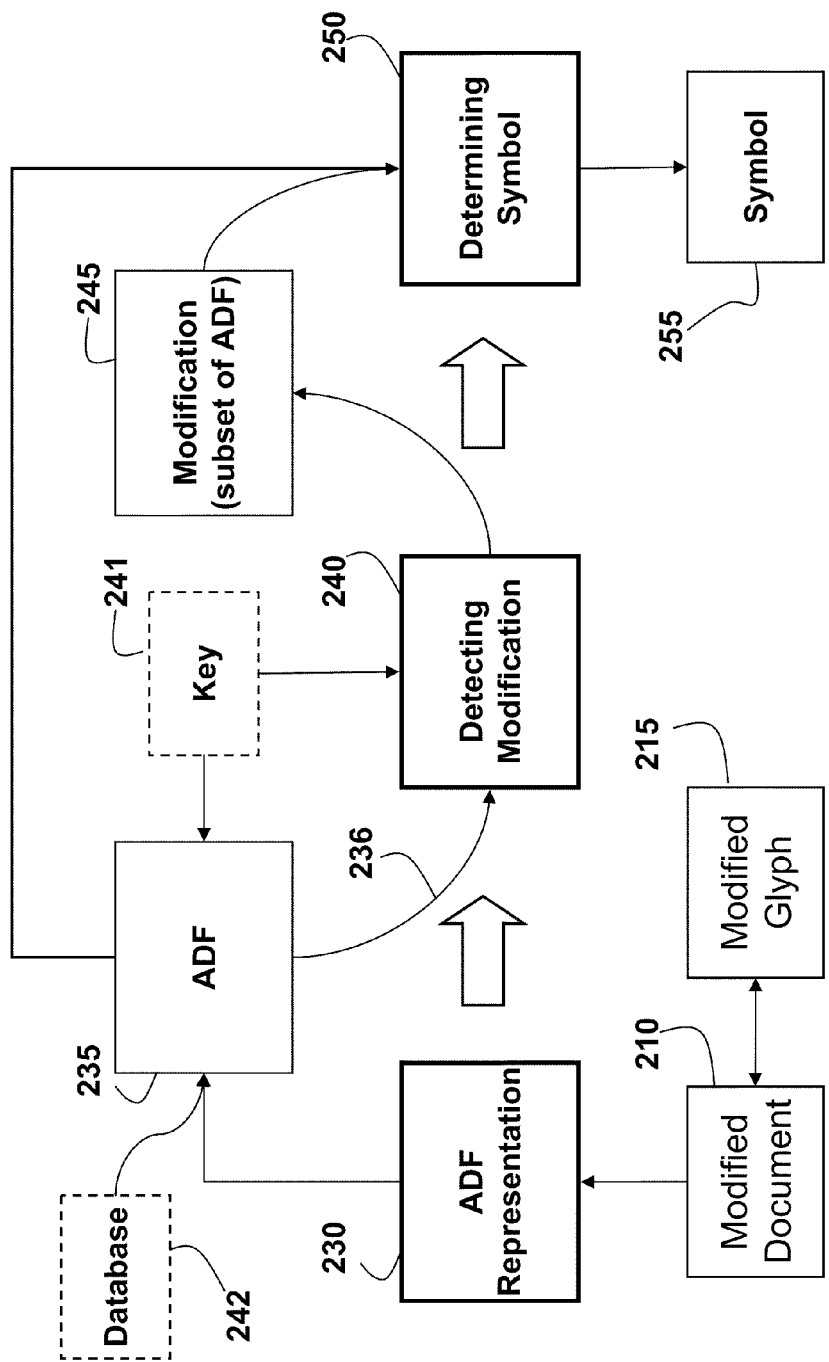
FIG. 2 is a block diagram of a method for detecting a symbol of a message in a document according to the embodiments of the invention.

FIG. 2 shows a block diagram of a method. 200 for detecting a symbol of a message in a document according to embodiments of the invention. The modified document 210 includes a modified glyph 215. The modified document 210 is a result of rendering the modified document 155 of FIG. 1, e.g., by printing or photocopying of the modified document 155. The modified document 210 could represent an entire or part of the modified document 155. Accordingly, the modified glyph 215 is analogous to the modified glyph 156 of FIG. 1.

The modified document 220 and/or the modified glyph 225 can be scanned to obtain a digital image, which can then be represented 230 as the ADF 235 including modified distance values. A modification 245 associated with a subset 236 of the modified distance values in the modified ADF 230 is detected 240. The subset 236 of the modified distance values could be selected with help of key 241. The key 241 is related to the key 141 of FIG. 1, e.g., identical to the key 141 or determined based on the key 141. Alternatively or additionally, the subset 236 could be determined with help of a database 242 of common shape elements of glyphs. The modification 245 determines 250 an embedded symbol 255.

Glyph Shape Representation with ADFs

A spatial hierarchy of the ADF can be represented using a number of data structures, such as wavelet decompositions, quadtrees in 2D, octrees in 3D, and tetrahedral meshes for higher dimensions.

Figure 3:
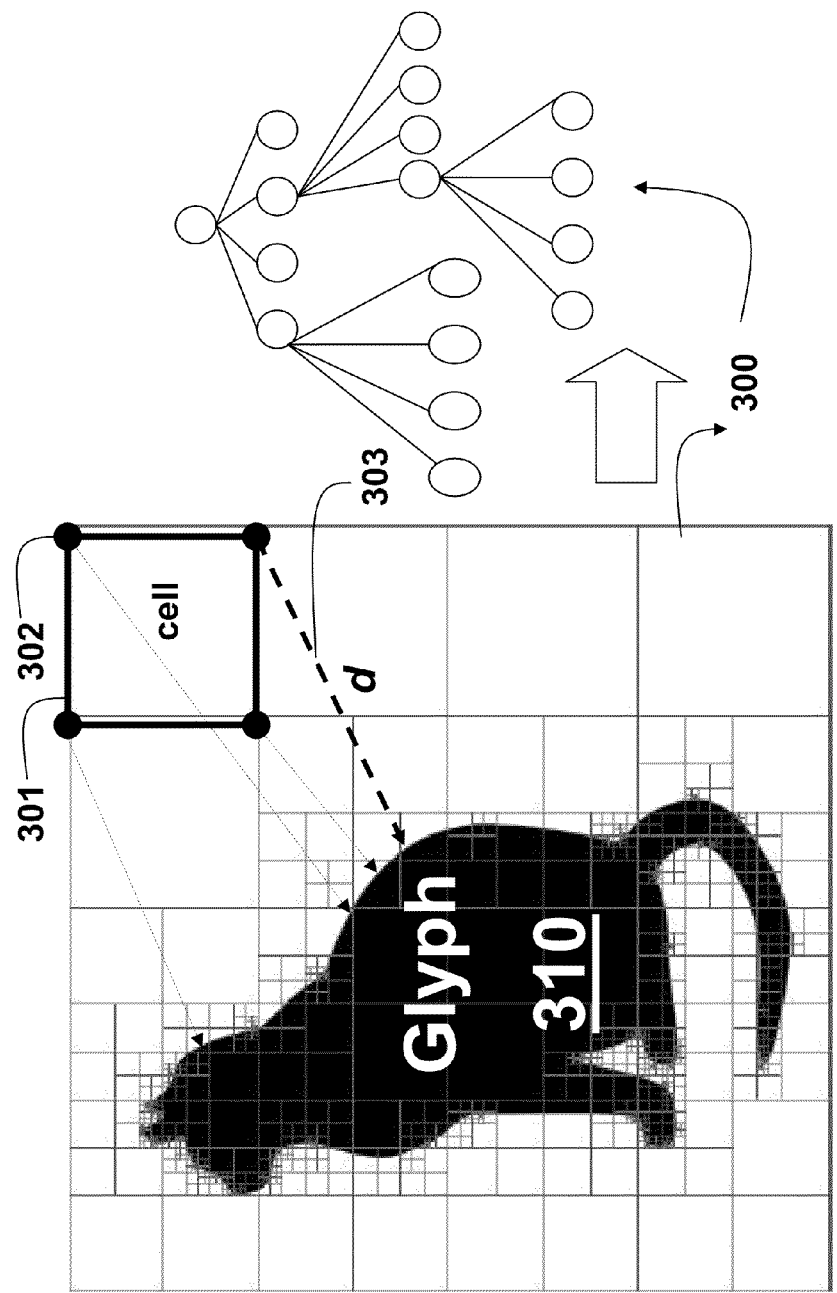
FIG. 3 is a block diagram of a quadtree representing a glyph according to the embodiments of the invention.

As shown in FIG. 3, one embodiment of the invention represents and modifies a glyph 310 using a quadtree 300, though other representations are equally applicable. The quadtree 300 includes square cells 301. Each cell has four vertices 302 at the corners. Each vertex is associated with a signed distance 303 measured from vertex to a nearest boundary of the glyph. Each cell includes a procedure to reconstruct the shape represented by the cell. For example, a bilinear interpolation procedure can be performed between cell vertices of the cells to reconstruct the shape within the cells.

Starting with the quadtree representation of a regularly sampled distance field, there are several ways to construct the ADF, two of which are described below.

In a top-down approach, the quadtree representation provides a coarse approximation of the shape. Some of the cells in this coarse representation contain the shape, while others do not. For some of the cells on the boundary of the shape, the interpolated distance values at this coarse approximation are sufficient to reconstruct the shape. For other cells, the interpolated distance values are inaccurate, e.g., for intricate regions with a high level of detail such as curvature, corners and points. These cells are recursively subdivided until the distance field provides a good approximation of the details. There are numerous criteria that can be used to distinguish a good approximation from a bad one, one example being the difference between the distances to the true shape and the distances to an approximate shape reconstructed by bilinear interpolation.

In a bottom-up approach, the quadtree representation provides an accurate representation of the shape up to a specified error tolerance. In this case, it is possible to combine a group of four adjacent cells into a single cell if, after the combining, the distance values interpolated from the distances associated with the vertices of the resulting large cell allow reconstruction of the shape up to the specified error tolerance.

Any of the above approaches can be used to make subtle modifications to the ADF. Then, the subtle differences between the unmodified ADF and the modified ADF can carry the embedded message. For instance, a slight modification in the curvature of the left edge of a glyph can encode a 0-bit, while a similar modification in the right edge can encode a 1-bit. Other modifications of the shape of the glyph 310 are possible to embed symbols of the message.

The specific modification that is selected depends on the application. For hard-copy documents, when robustness to photocopying is desired, a modification in the shape of the glyph 310 is likely to be more robust than a modification in the color or gray level of the glyph.

Color-Fringing for Message Embedding

One embodiment of our invention uses density values associated with the distance field of the ADF 135 to embed messages in documents displayed on electronic screens. The density values represent the colors of glyphs rendered on display devices, such as LCDs and LEDs, which have addressable pixel components. Sub-pixel rendering of glyphs on such devices results in the appearance of color-fringing artifacts at the boundaries of the glyphs. If the characteristics of the display and the content of the document are known, then it is possible to determine the locations where color-fringing appears. These locations give the candidate density values in which the symbols of the message may be embedded, as described earlier.

Aliasing Artifacts

As is known in the art, rendering glyphs on digital displays produces aliasing artifacts such as the well-known jaggies, see incorporated references. In one embodiment of our invention, we embed messages in the aliasing artifacts. In other words, we select the subset of the set of density values where the aliasing artifacts occur.

Example Embodiments

Embedding Messages in Documents

Figure 5:
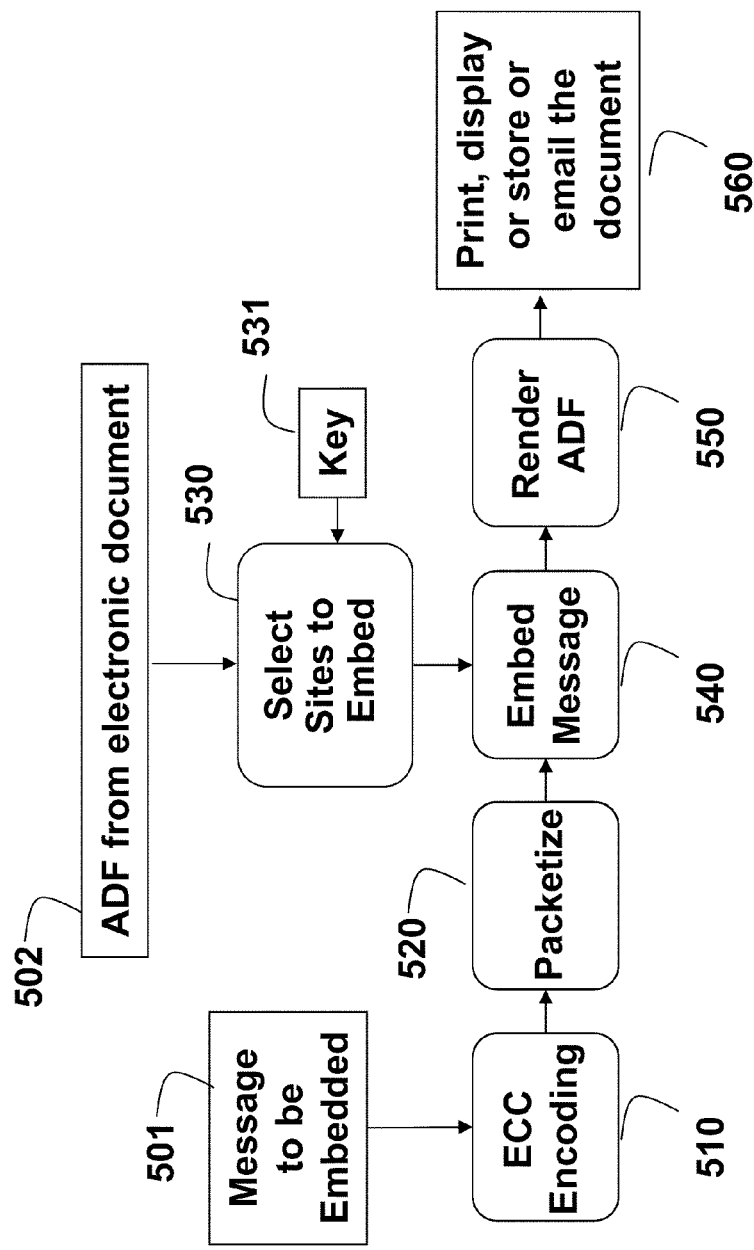
FIG. 5 is a flow diagram of a method for embedding a message of symbols into a document including a set of glyphs according to the embodiments of the invention.

FIG. 5 shows a method for embedding symbols of a message 501 into a document 502 including a set of glyphs. The glyphs in the document are represented by the ADF.

The symbols of the message are encoded 510 using an error correction code (ECC) to protect the message from intentional attacks and unintentional modifications to the document. Packetization symbols are added to enable decoding of the message in the presence of errors and noise. In the case of a printed document, errors and erasures can occur due to a physical deterioration of the document and limitations of the detector. For an electronic document, such as a portable document format (PDF) document, physical degradation or transmission errors are less likely. However, an error can still occur when the detector recovers an erroneous estimate of the embedded message. The ECC enables algebraic decoding or probabilistic (soft-decision) decoding. A convenient choice is to use Reed-Solomon codes. These codes are optimal for erasure correction. Further, successful Reed-Solomon decoding is guaranteed, irrespective of the pattern of errors as long as a certain minimal number of bits are decoded correctly.

The symbols of the message and the parity symbols are arranged 520 into packets that include synchronization symbols. This reduces the loss of synchronization at the detector, which, in turn, facilitates the decoding.

ADFs 502 are constructed for each glyph or for the entire document. The ADF is traversed to determine 530 sites or subsets, i.e., vertices, where the symbols can be embedded 540. The traversal of the ADF can be done in a raster scan order, along the periphery of the shape, or in any other convenient manner. In the preferred embodiment, the traversal is independent of the shape represented by the ADF.

Among the candidate sites suitable for message embedding and described by, e.g., the candidate distance values, some sites are selected using a secret key 531 which is known by the embedder and the detector.

Then, the symbols are embedded, one by one, at the selected sites. One simple way is to locally subsample the ADF at the site. This operation slightly reduces the fidelity with which that relevant portion of the shape is represented.

Another way slightly modifies the distance values in the neighborhood of the embedding site. Depending upon the way in which the distances are changed, the effect of this operation can be a subtle change in the local curvature of the shape of the glyph, which in turn embeds the symbols, i.e., a 0-bit or a 1-bit.

The document can then be rendered 550 using the modified ADF. Then, depending on the application, the document can be, for example, printed, e-mailed, or displayed on a screen 560.

Instead of modifying the ADF for each glyph independently, one embodiment takes advantage of the generality of the ADF. A region in the document that contains an arbitrary number of glyphs can be identified, and a single ADF can be constructed to represent that region. Thus, for the purposes of message embedding, the method can process multiple glyphs at a time, or an entire page of text, or some other graphic. The only requirement to embed the message in an arbitrary collection of glyphs is that one should be able to represent that collection using an ADF.

Detecting Messages in Documents

Figure 6:
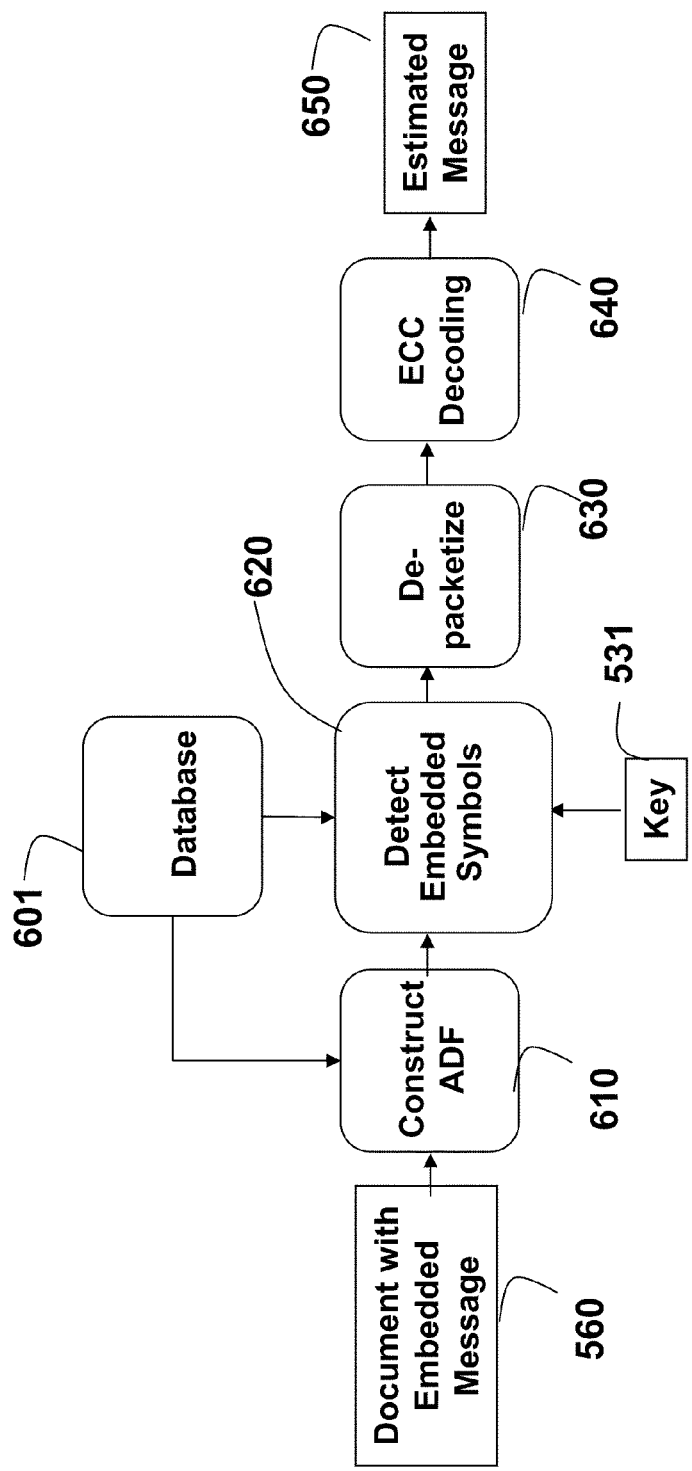
FIG. 6 is a flow diagram of a method for detecting a message of symbols in a document including a set of glyphs according to the embodiments of the invention.

FIG. 6 shows the method for detecting the message 650 in the modified document 560. An ADF is constructed 610 from the document 560. As described above, the ADF can represent individual glyphs or a group of glyphs. This information is either shared by the embedder and the detector, or explicitly sent to the detector as side information. The detector also knows the resolution at which the glyph is to be displayed, i.e., the decomposition level of the quadtree 300 associated with the glyph.

The detector can maintain a database 601 of ADFs representing each glyph at some predetermined resolution. Alternatively, the database can store a set of basic shapes such as strokes or serifs that are used as building blocks to construct more complex glyphs.

Using the key 531, the sites (vertices) in the ADF at which the message symbols and parity symbols are embedded are identified, and the distance values at the sites are detected 620 to recover the symbols of the message.

For example, if the error between the shape represented in the received document 560 at a particular site, and the shape at the given resolution is above a predetermined threshold, assume that a 0-bit has been embedded, otherwise assume that a 1-bit.

The recovered symbols are depacketized 630, and ECC decoding 640 is applied to estimate the message 650.

Applications of the Invention

This invention embeds messages in glyphs contained in documents. The term "glyph" as used herein includes, but is not limited to text characters, punctuation, numerals and dingbats in any font in any language. This includes English-like alphabets, or stroke-based fonts such as Japanese, Chinese, Korean, or Sanskrit Devanagari fonts. Glyphs can also be icons, logos, clipart, cartoon strips, and animated versions of all of the above.

The invention can be applied to glyphs in hard-copy documents that are the output of a printer, plotter or a fax machine, electronic documents such as PDF or PS files that are often sent as email attachments or transferred over the internet using a file transfer protocol (FTP), electronic documents that are the output of a word-processing program such as MS Word or Pages or a graphics editing suite such as Adobe Photoshop, documents that are rendered on a 2D or 3D digital display.

The invention enables the following applications: copyright protection and digital rights management (DRM), document authentication, detecting tampering, tracking the path of dissemination of a document, e.g., email, print, repeated photocopies, scans, reprinting, and device forensics.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for embedding symbols of a message into a document containing a set of glyphs, comprising:
   representing a glyph in a document as a distance field;
   representing a symbol in a message to be embedded in the document as a modification of a subset of values in the distance field; and
   modifying the subset of values in the distance field according to the modification to produce a modified glyph in a modified document, wherein the symbol in the message is embedded in the modified glyph, wherein steps of the method are performed by a processor.

2. The method of claim 1, wherein the distance field is a regularly sampled distance field.

3. The method of claim 1, wherein the distance field is an adaptively sampled distance field (ADF).

4. The method of claim 1, wherein the distance field is a set of values stored in a data structure in a memory device.

5. The method of claim 1, wherein the distance field includes procedures to reconstruct and render the glyph based on the message symbols to be embedded.

6. The method of claim 1, wherein the modification includes a deterministic modification and a probabilistic modification.

7. The method of claim 1, further comprising:
   selecting the subset of values in the distance field according to a key.

8. The method of claim 1, wherein the modification defines new values for the subset of values in the distance field.

9. The method of claim 1, wherein the modification defines correction values for the subset of values in the distance field.

10. The method of claim 1, wherein the modification defines correction values for a sampling density for the subset of values in the distance field.

11. The method of claim 1, further comprising
    selecting the subset of values in the distance field according to a local sampling density.

12. The method of claim 1, further comprising
    selecting the subset of values in the distance field according to locally computed gradients on a boundary of a shape of the glyph.

13. The method of claim 1, further comprising:
    inserting in the message at least one packetization symbol.

14. The method of claim 13, wherein the packetization symbol is selected from a group including a begin packet symbol, a packet number symbol, and a synchronization symbol.

15. The method of claim 1, further comprising:
    representing the modified glyph with a modified distance field including modified distance values;
    detecting an embedded modification associated with a subset of the modified distance values in the modified distance field; and
    determining the symbol of the message based on the embedded modification.

16. The method of claim 15, further comprising:
    determining the subset of the modified distance values according to a key.

17. The method of claim 15, further comprising:
    determining the subset of the modified distance values according to a database of shape elements of glyphs.

18. A method for embedding a message into a document, comprising:
    representing at least part of a document as a distance field including distance values;
    representing a symbol in a message to be embedded in the document as a modification of a subset of the values in the distance field; and
    modifying the subset of the values in the distance field according to the modification to produce a modified document, wherein the symbol in the message is embedded in the modified document, wherein steps of the method are performed by a processor.

19. The method of claim 18, wherein the subset of values in the distance field is associated with a glyph in the document.

20. The method of claim 18, further comprising:
    processing the modified document.

21. The method of claim 20, wherein the processing is selected from the group including rendering, copying, printing, fixing, emailing, displaying, scanning of the modified document, file transferring of the modified document or combinations thereof.

22. The method of claim 18, further comprising:
    selecting the subset of values in the distance field according to a key.

23. The method of claim 18, further comprising:
    representing the modified document with a modified distance field;
    detecting a modification associated with a subset of the modified distance values in the modified distance field; and
    determining the symbol of the message based on the modification.

24. The method of claim 23, further comprising:
  determining the subset of: values in the modified distance field according to a key.
25. The method of claim 23, further comprising:
  determining the subset of values in the modified distance field according to a database of shape elements of glyphs.

* * * * *